(12) United States Patent
Sue (10) Patent No.: US 11,762,218 B2
(45) Date of Patent: Sep. 19, 2023

(54) OPTICAL UNIT WITH SHAKE CORRECTION FUNCTION

(71) Applicant: NIDEC SANKYO CORPORATION, Nagano (JP)

(72) Inventor: Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 133 days.

(21) Appl. No.: 17/343,777

(22) Filed: Jun. 10, 2021

(65) Prior Publication Data

US 2021/0397018 A1 Dec. 23, 2021

(30) Foreign Application Priority Data

Jun. 22, 2020 (JP) .................. 2020-106663

(51) Int. Cl.
*G02B 27/64* (2006.01)
*G03B 5/06* (2021.01)

(52) U.S. Cl.
CPC ......... *G02B 27/646* (2013.01); *G02B 27/644* (2013.01); *G03B 5/06* (2013.01); *G03B 2205/0069* (2013.01)

(58) Field of Classification Search
CPC ...... G02B 27/646; G02B 27/644; G03B 5/06; G03B 2205/0069; G03B 30/00; G03B 2205/0023; G03B 5/00; G03B 2205/0007
See application file for complete search history.

(56) References Cited

U.S. PATENT DOCUMENTS

| 10,663,754 B2 | 5/2020 | Minamisawa |
| 11,165,325 B2 | 11/2021 | Kimura et al. |
| 2011/0181740 A1* | 7/2011 | Watanabe ............... H04N 23/68 348/E5.031 |

(Continued)

FOREIGN PATENT DOCUMENTS

| CN | 104216198 | 12/2014 |
| CN | 109426047 | 3/2019 |

(Continued)

OTHER PUBLICATIONS

"Office Action of China Counterpart Application", dated Mar. 2, 2023, with English translation thereof, pp. 1-16.

*Primary Examiner* — Darryl J Collins
*Assistant Examiner* — Matthew Y Lee
(74) *Attorney, Agent, or Firm* — JCIPRNET (57) ABSTRACT

An optical unit with a shake correction function includes a fixed body, a movable body having an optical element, a swing support mechanism swingably supporting the movable body, a magnetic drive mechanism structured to swing the movable body, and a magnetic spring structured to return the movable body to a home position where a predetermined axial line and an optical axis of the optical element are coincided with each other. The magnetic spring includes a home position returning magnet disposed in one of the movable body and the fixed body, and an attracted member disposed in the other of the movable body and the fixed body so that a magnetic attraction force acts between the attracted member and the home position returning magnet. The attracted member and the home position returning magnet are disposed on the optical axis and face each other in a direction of the optical axis.

11 Claims, 3 Drawing Sheets

(56) References Cited

U.S. PATENT DOCUMENTS

2019/0379266 A1* 12/2019 Takizawa ................. H02K 3/46

FOREIGN PATENT DOCUMENTS

| | | |
|---|---|---|
| JP | 2012042793 | 3/2012 |
| JP | 2014235377 | 12/2014 |
| JP | 2018189816 | 11/2018 |
| WO | 2020039945 | 2/2020 |

* cited by examiner

OPTICAL UNIT WITH SHAKE CORRECTION FUNCTION

CROSS REFERENCE TO RELATED APPLICATION

The present invention claims priority under 35 U.S.C. § 119 to Japanese Application No. 2020-106663 filed Jun. 22, 2020, the entire content of which is incorporated herein by reference.

TECHNICAL FIELD

The present invention relates to an optical unit with a shake correction function which is structured to correct an inclination of an optical element.

BACKGROUND

Some optical units mounted on a portable terminal or a movement body such as a vehicle and an unmanned helicopter are structured to correct a shake of an optical element by swinging the optical element in order to restrain a disturbance of a photographed image due to a shake of the optical unit. An optical unit with a shake correction function described in Japanese Patent Laid-Open No. 2018-189816 (Patent Literature 1) includes a movable body having an optical element, a swing support mechanism which swingably supports the movable body, a fixed body which supports the movable body through a swing support mechanism, and a magnetic drive mechanism structured to swing the movable body. The swing support mechanism is a gimbal mechanism which swingably supports the movable body between a home position where a predetermined axial line and an optical axis of the optical element are coincided with each other and an inclination position where the optical axis is inclined with respect to the predetermined axial line. The magnetic drive mechanism includes a coil fixed to the movable body and a magnet which is fixed to the fixed body and faces the coil.

The optical unit with a shake correction function described in Patent Literature 1 includes a magnetic member which faces the magnet of the magnetic drive mechanism interposing the coil of the magnetic drive mechanism therebetween. The magnetic member and the magnet structure a magnetic spring for returning the movable body to the home position. In Patent Literature 1, the magnetic member is disposed on the movable body and the magnet is disposed on the fixed body. When the movable body is inclined from the home position, a center of the magnetic member is deviated from a magnetized polarizing line of the magnet when viewed in a radial direction and thus, a magnetic attraction force is acted in a direction for returning the movable body to the home position.

In a case that a magnetic member is disposed in a movable body for providing a magnetic spring, when the magnetic member is not disposed in a well-balanced manner with respect to a swing center of the movable body, characteristics of an optical unit with a shake correction function are deteriorated due to a magnetic attraction force of the magnetic spring. For example, when a magnetic member is disposed at only one position for reducing a size of an optical unit, the movable body is attracted in a direction where the magnetic member is disposed and thus, the optical axis of an optical element and a swing center of the movable body are deviated from each other.

SUMMARY

In view of the problems described above, at least an embodiment of the present invention may advantageously provide an optical unit with a shake correction function in which a size of a magnetic spring is capable of being reduced and generation of optical axis deviation due to the magnetic spring is avoided.

According to at least an embodiment of the present invention, there may be provided an optical unit with a shake correction function including a movable body having an optical element, a swing support mechanism which swingably supports the movable body, a fixed body which supports the movable body through the swing support mechanism, a magnetic drive mechanism structured to swing the movable body, and a magnetic spring structured to return the movable body to a home position where a predetermined axial line and an optical axis of the optical element are coincided with each other. The magnetic spring includes a home position returning magnet which is disposed in one of the movable body and the fixed body, and an attracted member which is disposed in the other of the movable body and the fixed body so that a magnetic attraction force acts between the attracted member and the home position returning magnet, and the attracted member and the home position returning magnet are disposed on the optical axis and face each other in a direction of the optical axis.

According to at least an embodiment of the present invention, the attracted member and the home position returning magnet which structure a magnetic spring are disposed on the optical axis and face each other in the optical axis direction. Therefore, the attracted member and the home position returning magnet are respectively disposed at only one position and thus, a size of the magnetic spring can be reduced. Further, an attracted direction where the attracted member is attracted to the home position returning magnet is the optical axis direction and thus, deviation of the optical axis due to the magnetic attraction force can be avoided. Therefore, deviation of the optical axis due to the magnetic spring can be avoided. In addition, the home position returning magnet is not used as a magnet structuring the magnetic drive mechanism and thus, a single-pole magnetized magnet may be used. Therefore, an inexpensive magnet may be used.

In the present invention, it is preferable that the attracted member is a magnetic member. When a magnetic member such as a metal plate is used, a size of the attracted member can be reduced. Therefore, a size of the magnetic spring can be reduced.

In the present invention, it is preferable that shapes of the magnetic member and the home position returning magnet are similar to each other. According to this structure, the magnetic member and the home position returning magnet are easily positioned.

In the present invention, it is preferable that shapes of the magnetic member and the home position returning magnet are a quadrangle. According to this structure, the magnetic member and the home position returning magnet are easily manufactured.

In the present invention, it is preferable that the magnetic drive mechanism includes a first magnetic drive mechanism structured to swing the movable body around a first swing axis perpendicular to the optical axis, and a second magnetic drive mechanism structured to swing the movable body around a second swing axis which is perpendicular to the optical axis and intersects the first swing axis. A driving current in the first magnetic drive mechanism for swinging the movable body by a predetermined angle around the first swing axis is smaller than a driving current in the second magnetic drive mechanism for swinging the movable body by the predetermined angle around the second swing axis, and the shapes of the magnetic member and the home position returning magnet are a rectangle, and a short side direction of the rectangle is a direction along the first swing axis and a long side direction of the rectangle is a direction along the second swing axis. According to this structure, a planar shape of the magnetic spring can be optimized so that a home position return force of the magnetic spring is set to a magnitude corresponding to a swing load of the movable body. Therefore, a size and weight of the magnetic spring can be reduced.

In the present invention, it is preferable that the optical unit with a shake correction function further includes a flexible printed circuit board which is connected with the movable body, the shapes of the magnetic member and the home position returning magnet are a rectangle, and a short side direction of the rectangle is an extended direction of the flexible printed circuit board and a long side direction of the rectangle is a direction perpendicular to the extended direction. According to this structure, a planar shape of the magnetic spring can be optimized so that a home position return force of the magnetic spring is set to be a magnitude corresponding to a swing load of the movable body due to the flexible printed circuit board. Therefore, the size and weight of the magnetic spring can be reduced.

In at least an embodiment of the present invention, the swing support mechanism is a gimbal mechanism. When a gimbal mechanism is used, an arrangement space for the swing support mechanism is easily secured and thus, a size of the optical unit can be reduced.

Effects of the Invention

According to at least an embodiment of the present invention, the attracted member and the home position returning magnet which structure a magnetic spring are disposed on the optical axis and face each other in the optical axis direction. Therefore, the attracted member and the home position returning magnet are respectively disposed at only one position and thus, a size of the magnetic spring can be reduced. Further, an attracted direction where the attracted member is attracted to the home position returning magnet is the optical axis direction and thus, deviation of the optical axis due to the magnetic attraction force can be avoided. Therefore, the deviation of the optical axis due to the magnetic spring can be avoided. In addition, the home position returning magnet is not used as a magnet structuring the magnetic drive mechanism and thus, a single-pole magnetized magnet may be used. Therefore, an inexpensive magnet may be used.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION (Entire Structure)

Figure 1:
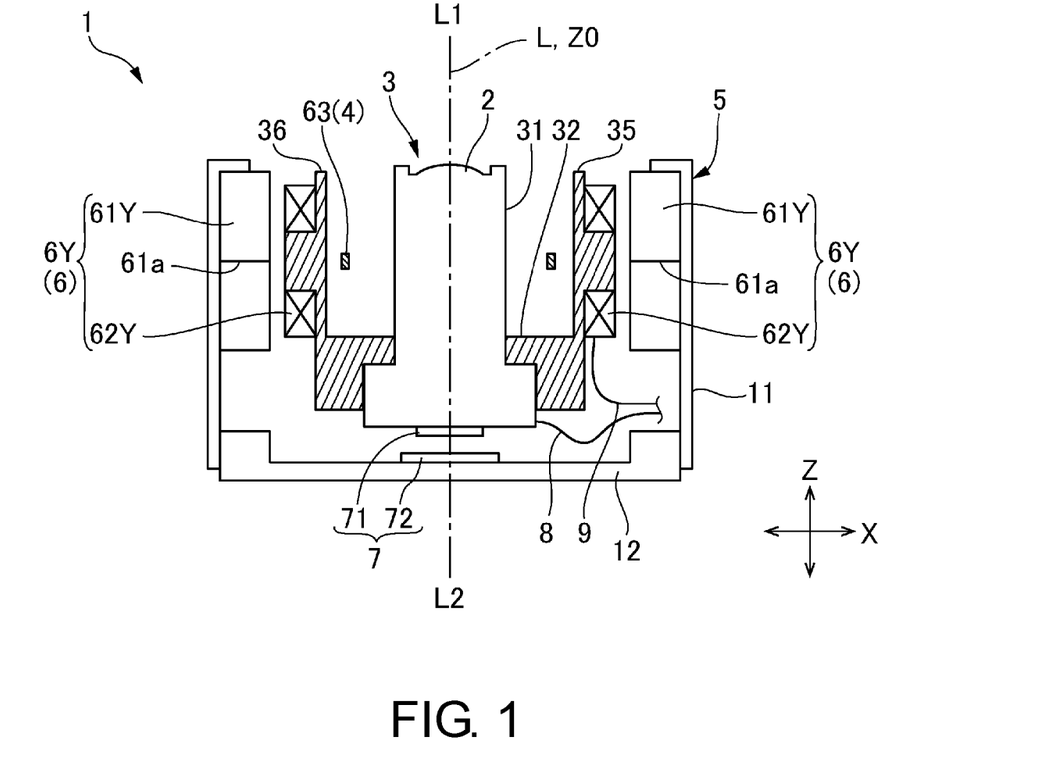
FIG. 1 is a cross-sectional view showing an optical unit with a shake correction function to which the present invention is applied and which is cut by a plane including an optical axis.
Figure 2:
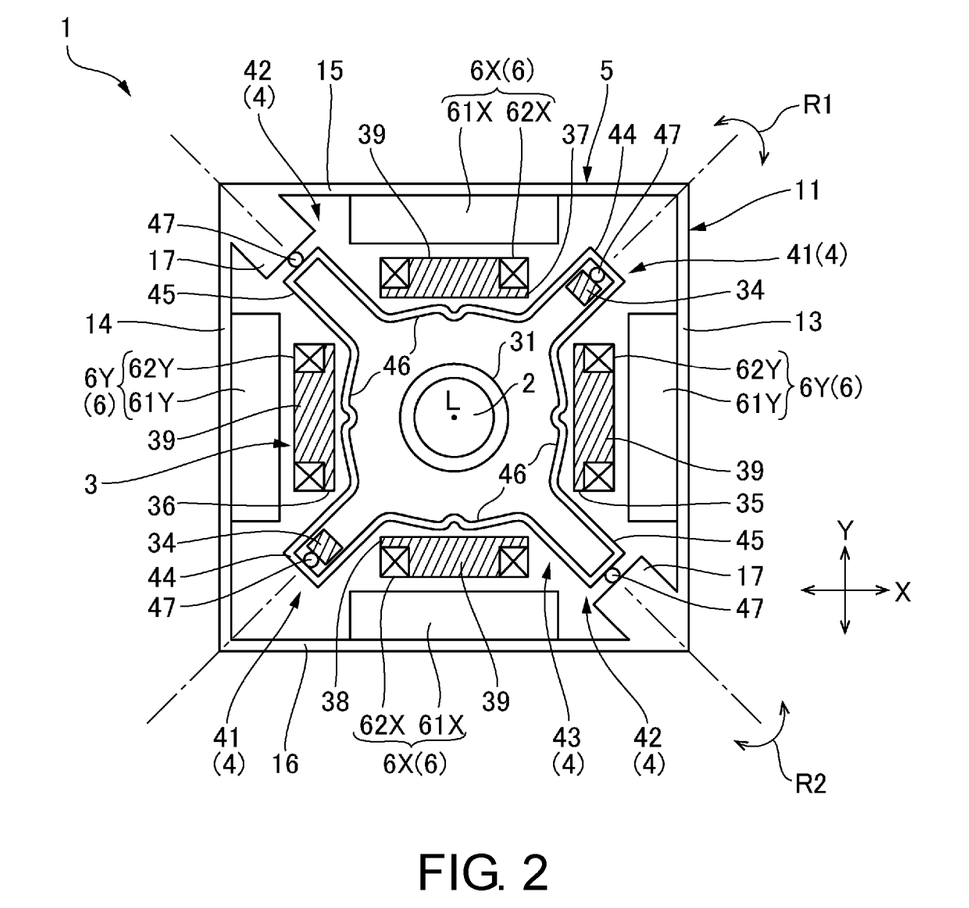
FIG. 2 is a cross-sectional view showing the optical unit with a shake correction function shown in FIG. 1 which is cut by a plane perpendicular to the optical axis.

An embodiment of an optical unit 1 with a shake correction function to which the present invention is applied will be described below with reference to the accompanying drawings. FIG. 1 is a cross-sectional view showing an optical unit 1 with a shake correction function to which the present invention is applied and which is cut by a plane including an optical axis "L". FIG. 2 is a cross-sectional view showing the optical unit 1 with a shake correction function shown in FIG. 1 which is cut by a plane perpendicular to the optical axis "L".

As shown in FIGS. 1 and 2, an optical unit 1 with a shake correction function (hereinafter, referred to as an optical unit 1) includes a movable body 3 having an optical element 2 and an imaging element 10, a swing support mechanism 4 which swingably supports the movable body 3, and a fixed body 5 which supports the movable body 3 through the swing support mechanism 4. Further, the optical unit 1 includes a magnetic drive mechanism 6 structured to swing the movable body 3, a magnetic spring 7 structured to return the movable body 3 to a home position for a shake correction, and flexible printed circuit boards 8 and 9 which are connected with the movable body 3.

The movable body 3 is swingably supported by the swing support mechanism 4 between a home position where a predetermined axial line "Z0" and an optical axis "L" of the optical element 2 are coincided with each other and a maximum inclination position where the optical axis "L" is inclined by a predetermined angle (for example, 3°) with respect to the axial line "Z0". In the optical unit 1, an electric current supplied to the magnetic drive mechanism 6 is controlled to swing the movable body 3 between the home position and the maximum inclination position. In this embodiment, the axial line "Z0" is a center axial line of the fixed body 5. FIGS. 1 and 2 show states that the movable body 3 is stopped at the home position and the optical axis "L" and the axial line "Z0" are coincided with each other.

As shown in FIG. 1, one side "L1" in the optical axis "L" direction is an object side in the optical unit 1 and the other side "L2" is an anti-object side (image side). In the present specification, three axes of "X", "Y" and "Z" are directions perpendicular to each other. The axial line "Z0" is coincided with the "Z"-axis direction. The optical unit 1 swings the movable body 3 around the "X"-axis and around the "Y"-axis to perform a shake correction. In the present specification, the "X"-axis is a first swing axis and the "Y"-axis is a second swing axis.

The optical unit 1 is, for example, used in an optical device such as a cell phone with a camera and a drive recorder or in an optical device such as an action camera mounted on a movement body such as a helmet, a bicycle, a radio-controlled helicopter or a wearable camera. In the optical device, when a shake is occurred in the optical device at the time of photographing, a disturbance is generated in a photographed image. In order to avoid a photographed image being inclined, the optical unit 1 corrects an inclination of the optical element 2.

(Swing Support Mechanism)

The swing support mechanism 4 is a gimbal mechanism. As shown in FIG. 2, in this embodiment, the movable body 3 is disposed at a center of the fixed body 5. The movable body 3 is swingably supported around a first axial line "R1" intersecting the axial line "Z0" and is swingably supported around a second axial line "R2" intersecting the axial line "Z0" and the first axial line "R1" by the swing support mechanism 4. The first axial line "R1" and the second axial line "R2" are diagonal directions of the fixed body 5 and are perpendicular to the axial line "Z0" which is a center axial line of the fixed body 5. Further, the first axial line "R1" and the second axial line "R2" are perpendicular to each other. In this embodiment, the movable body 3 is swung around the "X"-axis and around "Y"-axis by combining turning around the first axial line "R1" with turning around the second axial line "R2". In this manner, a shake correction around the "X"-axis (around the first swing axis) and a shake correction around the "Y"-axis (around the second swing) are performed.

As shown in FIG. 2, in a state that the movable body 3 has been assembled to the fixed body 5, the swing support mechanism 4 includes first swing support parts 41, which are disposed at two positions separated in the first axial line "R1" direction, second swing support parts 42 disposed at two positions separated in the second axial line "R2" direction, and a movable frame 43 which is supported by the first swing support parts 41 and the second swing support parts 42. The movable frame 43 is a gimbal spring. The movable frame 43 is provided with first supporting point parts 44, which are provided at diagonal positions in the first axial line "R1" direction, second supporting point parts 45 provided at diagonal positions in the second axial line "R2" direction, and four connecting parts 46 each of which connects the first supporting point part 44 with the second supporting point part 45 adjacent to each other around the axial line "Z0". The connecting part 46 is provided with a meandering part and is elastically deformable in a direction perpendicular to the axial line "Z0".

Each of the first supporting point part 44 and the second supporting point part 45 of the movable frame 43 is fixed with a spherical body 47 made of metal by welding or the like. The first swing support part 41 is provided in the movable body 3 and the second swing support part 42 is provided in the fixed body 5. The first swing support part 41 is provided with a recessing curved face (not shown) which is point-contacted with the spherical body 47 of the first supporting point part 44 in the first axial line "R1" direction. Further, the second swing support part 42 is provided with a recessing curved face (not shown) which is point-contacted with the spherical body 47 of the second supporting point part 45 in the second axial line "R2" direction. Each of the recessing curved faces is provided in an elastic member such as a contact spring and is elastically contacted with the spherical body 47. In this manner, the movable body 3 and the fixed body 5 are connected with each other through the swing support mechanism 4.

(Fixed Body)

As shown in FIGS. 1 and 2, the fixed body 5 includes a first case 11 in a tube shape which surrounds an outer peripheral side of the movable body 3, and a second case 12 which is fixed to an end part on the anti-object side (image side) of the first case 11. The first case 11 is provided with side plates 13 and 14 facing each other in the "X"-axis direction and side plates 15 and 16 facing each other in the "Y"-axis direction. Each of inner peripheral faces of the side plates 15 and 16 facing each other in the "Y"-axis direction is fixed with a first drive magnet 61X. Further, each of inner peripheral faces of the side plates 13 and 14 facing each other in the "X"-axis direction is fixed with a second drive magnet 61Y. Since the first case 11 is structured of magnetic material, the first case 11 functions as a yoke for the first drive magnets 61X and the second drive magnets 61Y.

As shown in FIG. 2, the second case 12 is provided with point contact member holding parts 17 which are disposed at diagonal positions on the second axial line "R2". The point contact member holding part 17 holds an elastic member (not shown) such as a contact spring which structures the second swing support part 42 of the swing support mechanism 4.

(Movable Body)

As shown in FIGS. 1 and 2, the movable body 3 includes an optical module 31 and a holder 32 which holds the optical module 31. The optical module 31 includes an optical element 2 such as a lens, and an imaging element which is disposed on the optical axis "L" of the optical element 2. The holder 32 is provided with a frame part 33, which is provided with a holding hole to which the optical module 31 is fitted, a pair of wall parts 35 and 36 which are stood up from both ends in the "X"-axis direction of the frame part 33 to the object side "L1" and are extended in the "Y"-axis direction, and a pair of wall parts 37 and 38 which are stood up from both ends in the "Y"-axis direction of the frame part 33 to the object side "L1" and are extended in the "X"-axis direction.

In each of the wall parts 35, 36, 37 and 38, an outer side face facing outside in a radial direction is provided with a coil fixing part 39. Each of the coil fixing parts 39 of the wall parts 37 and 38 facing each other in the "Y"-axis direction is fixed with a first drive coil 62X. Each of the coil fixing parts 39 of the wall parts 35 and 36 facing each other in the "X"-axis direction is fixed with a second drive coil 62Y. Further, a Hall element 63 is fixed to the coil fixing part 39 of the wall part 35 and the coil fixing part 39 of the wall part 37.

The holder 32 is provided with point contact member holding parts 34 which are disposed at diagonal positions on the first axial line "R1" of the frame part 33. The point contact member holding part 34 holds an elastic member (not shown) such as a contact spring which structures the first swing support part 41 of the swing support mechanism 4.

Flexible printed circuit boards 8 and 9 are extended in the "X"-axis direction from portions on the anti-object side "L2" of the movable body 3. The flexible printed circuit boards 8 and 9 are extended in a resiliently bent shape so that the movable body 3 is capable of being swung, and they are extended to the outside of the first case 11 and the second case 12. The flexible printed circuit board 8 is provided with a signal line and a power feeding line connected with the imaging element. Further, the flexible printed circuit board 9 is provided with power feeding lines which are connected with the first drive coil 62X and the second drive coil 62Y of the magnetic drive mechanism 6.

(Magnetic Drive Mechanism)

The magnetic drive mechanism 6 includes a first magnetic drive mechanism 6X structured to swing the movable body 3 around the "X"-axis (around the first swing axis) and a second magnetic drive mechanism 6Y structured to swing the movable body 3 around the "Y"-axis (around the second swing axis). The first magnetic drive mechanism 6X includes two sets of a pair structured of the first drive magnet 61X and the first drive coil 62X which face each other in the "Y"-axis direction. The two first drive coils 62X are electrically connected so that magnetic-drive forces are generated in the same direction around the "X"-axis when electric power is supplied. Further, the second magnetic drive mechanism 6Y includes two sets of a pair structured of the second drive magnet 61Y and the second drive coil 62Y which face each other in the "X"-axis direction. The two second drive coils 62Y are electrically connected so that magnetic-drive forces are generated in the same direction around the "Y"-axis when electric power is supplied.

As shown in FIG. 1, each of the first drive magnet 61X and the second drive magnet 61Y is polarized and magnetized in two portions in the "Z"-axis direction. Therefore, the first drive magnet 61X and the second drive magnet 61Y are respectively magnetized so that magnetic poles on their inner peripheral face sides are different from each other with a magnetized polarizing line 61a, which is perpendicular to the axial line "Z0" and is extended in a circumferential direction, as a boundary. The first drive coil 62X and the second drive coil 62Y are air core coils, and their long side portions on the "+Z" direction side and the "−Z" direction side are utilized as an effective side. When the movable body 3 is located at the home position, each of the Hall elements 63 faces the magnetized polarizing line 61a of the magnet which is located on an outer peripheral side with respect to the Hall element 63.

The magnetic drive mechanism 6 swings the movable body 3 having the optical module 31 around the "X"-axis by applying an electric current to the first drive coils 62X. Further, the magnetic drive mechanism 6 swings the movable body 3 having the optical module 31 around the "Y"-axis by applying an electric current to the second drive coils 62Y. In this manner, a shake correction around the "X"-axis and a shake correction around the "Y"-axis are performed.

In accordance with an embodiment of the present invention, the magnetic drive mechanism 6 may be structured so that the first drive coil 62X and the second drive coil 62Y are provided in the fixed body 5 and that the first drive magnet 61X and the second drive magnet 61Y are provided in the movable body 3.

In the optical unit 1, as described above, the flexible printed circuit boards 8 and 9 are extended from the movable body 3 toward the "X"-axis direction. Therefore, loads for resiliently bending the flexible printed circuit boards 8 and 9 around the "X"-axis (around the first swing axis) are smaller than loads for resiliently bending the flexible printed circuit boards 8 and 9 around the "Y"-axis (around the second swing axis). Therefore, a swing load when the movable body 3 is swung around the "X"-axis (around the first swing axis) is smaller than a swing load when the movable body 3 is swung around the "Y"-axis (around the second swing axis).

In the magnetic drive mechanism 6, in a case that a driving current for swinging the movable body 3 around the "X"-axis at a maximum swing angle (for example, 3°) is set to be "Cx" and a driving current for swinging the movable body 3 around the "Y"-axis at a maximum swing angle (for example, 3°) is set to be "Cy", the driving currents "Cx" and "Cy" are set depending on magnitudes of swing loads. In this embodiment, as described above, a swing load around the "X"-axis is smaller than a swing load around the "Y"-axis and thus, the driving current "Cx" is set to be smaller than the driving current "Cy". For example, in a case that the driving current "Cx" is 30 mA, the driving current "Cy" is set to be 60 mA.

(Magnetic Spring)

As shown in FIG. 1, the magnetic spring 7 includes a magnetic member 71 disposed on the movable body 3 and a home position returning magnet 72 disposed on the fixed body 5. The magnetic member 71 is a thin plate made of magnetic metal and is disposed on an end face (bottom face) on the anti-object side "L2" of the movable body 3. The home position returning magnet 72 faces the magnetic member 71 in the optical axis "L" direction and is disposed on the second case 12. The magnetic member 71 and the home position returning magnet 72 are disposed on the optical axis "L" and face each other in the optical axis "L" direction. The magnetic member 71 is an attracted member to which a magnetic attraction force is applied by the home position returning magnet 72. The home position returning magnet 72 is a single-pole magnetized magnet.

Figure 3:
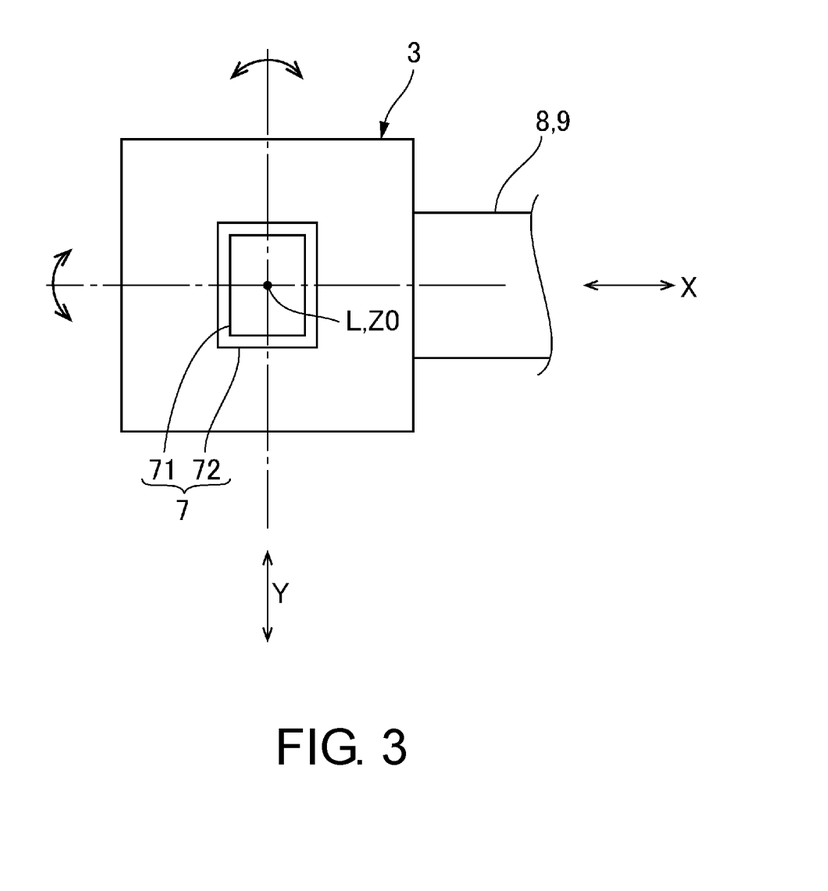
FIG. 3 is a plan view showing a movable body, a magnetic spring and a flexible printed circuit board.

FIG. 3 is a plan view showing the movable body 3, the magnetic spring 7 and the flexible printed circuit boards 8 and 9. As shown in FIG. 3, planar shapes of the magnetic member 71 and the home position returning magnet 72 when viewed in the optical axis "L" direction are quadrangular or rectangular. In this embodiment, the shapes of the magnetic member 71 and the home position returning magnet 72 are similar to each other and a center of the magnetic member 71 and a center of the home position returning magnet 72 are located on the optical axis "L". In this embodiment, the magnetic member 71 is smaller than the home position returning magnet 72. However, the present invention is not limited to such a dimensional relationship.

The magnetic spring 7 is structured so that the movable body 3 is returned to the home position by a magnetic attraction force acted between the magnetic member 71 and the home position returning magnet 72 in a state that power supply to the magnetic drive mechanism 6 is cut off. As described above, in this embodiment, the swing loads of the movable body 3 around the "X"-axis and around the "Y"-axis are different from each other, and a swing load around the "X"-axis is smaller than a swing load around the "Y"-axis. Therefore, in the magnetic spring 7, the shapes of the magnetic member 71 and the home position returning magnet 72 are optimized so that a magnetic attraction force around the "X"-axis is smaller than a magnetic attraction force around the "Y"-axis. In other words, the shapes of the magnetic member 71 and the home position returning magnet 72 are rectangular, and long side directions of the magnetic member 71 and the home position returning magnet 72 are the "Y"-axis direction (second swing axis direction). Further, short side directions of the magnetic member 71 and the home position returning magnet 72 are the "X"-axis direction (first swing axis direction).

(Principal Operations and Effects in this Embodiment)

As described above, the optical unit 1 in this embodiment includes the movable body 3 having the optical element 2, the swing support mechanism 4 which swingably supports the movable body 3, the fixed body 5 which supports the movable body 3 through the swing support mechanism 4, the magnetic drive mechanism 6 structured to swing the movable body 3, and the magnetic spring 7 structured to return the movable body 3 to the home position where a predetermined axial line "Z0" and the optical axis "L" of the optical element 2 are coincided with each other. The magnetic spring 7 includes the home position returning magnet 72 disposed on the fixed body 5 and the magnetic member 71 which is an attracted member which is disposed on the movable body 3 and to which a magnetic attraction force is applied by the home position returning magnet 72. The magnetic member 71 and the home position returning magnet 72 are disposed on the optical axis "L" and face each other in the optical axis "L" direction.

According to this embodiment, the magnetic member 71 (attracted member) and the home position returning magnet 72 which structure the magnetic spring 7 are disposed on the optical axis "L" and face each other in the optical axis direction. Therefore, the magnetic spring 7 can be structured by respectively disposing the magnetic member 71 and the home position returning magnet 72 at only one position and thus, a size of the magnetic spring 7 can be reduced. Further, an attracted direction where the magnetic member 71 is attracted to the home position returning magnet 72 is the optical axis "L" direction and thus, deviation of the optical axis due to the magnetic attraction force can be avoided. Therefore, the deviation of the optical axis due to the magnetic spring 7 can be avoided. In addition, the home position returning magnet 72 is not used as a magnet of the magnetic drive mechanism 6 (first drive magnet 61X and second drive magnet 61Y) and thus, a single-pole magnetized magnet may be used. Therefore, an inexpensive magnet may be used. Further, the magnetic member 71 is used as an attracted member and thus, a size of the magnetic spring 7 can be reduced.

In accordance with an embodiment of the present invention, arrangement of the magnetic member 71 and the home position returning magnet 72 in this embodiment which structure the magnetic spring 7 may be reversed. In other words, it may be structured that the home position returning magnet 72 is disposed in a bottom part of the movable body 3 and the magnetic member 71 is disposed in the second case 12.

In this embodiment, the shapes of the magnetic member 71 and the home position returning magnet 72 are similar to each other. Therefore, the magnetic member 71 and the home position returning magnet 72 are easily positioned. Further, the shapes of the magnetic member 71 and the home position returning magnet 72 are quadrangular. Therefore, the magnetic member 71 and the home position returning magnet 72 are easily manufactured.

In this embodiment, the magnetic drive mechanism 6 includes the first magnetic drive mechanism 6X structured to swing the movable body 3 around the "X"-axis (first swing axis) perpendicular to the optical axis "L", and the second magnetic drive mechanism 6Y structured to swing the movable body 3 around the "Y"-axis (second swing axis) perpendicular to the optical axis "L" and perpendicular to the "X"-axis (first swing axis). A driving current "Cx" in the first magnetic drive mechanism 6X for swinging the movable body 3 around the "X"-axis (first swing axis) at a maximum inclination angle (predetermined angle) is smaller than a driving current "Cy" in the second magnetic drive mechanism 6Y for swinging the movable body 3 around the "Y"-axis (second swing axis) at a maximum inclination angle (predetermined angle). In this embodiment, as described above, inclination sensitivities for inclining the movable body 3 are different according to a swing direction, and the shape of the magnetic spring 7 is optimized in consideration of a difference of the inclination sensibilities in a swing direction. In this case, the second swing axis is not required to be perpendicular to the first swing axis, and the second swing axis may be a direction intersecting the first swing axis.

In other words, in this embodiment, the shapes of the magnetic member 71 and the home position returning magnet 72 are rectangular, and their long side directions are directions along the "Y"-axis (second swing axis) and their short side directions are directions along the "X"-axis (first swing axis). As described above, when a direction whose inclination sensibility is smaller is set to be a long side direction and a direction whose inclination sensibility is larger is set to be a short side direction, a home position return force in a direction whose inclination sensibility is small can be increased than a home position return force in a direction whose inclination sensibility is large. Therefore, the shapes of the magnetic member 71 and the home position returning magnet 72 are optimized and thus, a size and weight of the magnetic spring 7 can be reduced.

In this embodiment, the optical unit 1 includes the flexible printed circuit boards 8 and 9 which are connected with the movable body 3. The shapes of the magnetic member 71 and the home position returning magnet 72 are rectangular, and their short side directions are directions ("X"-axis direction) where the flexible printed circuit boards 8 and 9 are extended, and their long side directions are directions perpendicular to the extended direction ("Y"-axis direction) of the flexible printed circuit boards 8 and 9. In this embodiment, as described above, the flexible printed circuit boards 8 and 9 are structured to be resiliently bent so that their shapes when the movable body 3 is swung around the "X"-axis are different from their shapes when the movable body 3 is swung around the "Y"-axis. Therefore, a swing load around the "X"-axis and a swing load around the "Y"-axis are different from each other and thus, the shape of the magnetic spring 7 is optimized in consideration of the difference.

In other words, in the optical unit 1, the swing load around the "Y"-axis perpendicular to the extended direction of the flexible printed circuit boards 8 and 9 is larger than the swing load around the "X"-axis which is along the extended direction of the flexible printed circuit boards 8 and 9. Therefore, when the direction perpendicular to the extended direction of the flexible printed circuit boards 8 and 9 is set as a long side direction and the extended direction is set as a short side direction, a home position return force in a direction that a swing load is large can be increased in comparison with a home position return force in a direction that a swing load is small. Accordingly, the shapes of the magnetic member 71 and the home position returning magnet 72 are optimized and thus, the size and weight of the magnetic spring 7 can be reduced.

In this embodiment, the swing support mechanism 4 which swingably supports the movable body 3 is a gimbal mechanism. When the gimbal mechanism is used, an arrangement space of the swing support mechanism 4 is easily secured and a size of the optical unit 1 can be reduced.

(Other Embodiment)

In the embodiment described above, the attracted member to which a magnetic attraction force is applied by the home position returning magnet is the magnetic member 71 such as a metal plate. However, a coil may be used as the attracted member.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function, comprising:
    a movable body comprising an optical element;
    a swing support mechanism which swingably supports the movable body;
    a fixed body which supports the movable body through the swing support mechanism;
    a magnetic drive mechanism structured to swing the movable body; and
    a magnetic spring structured to return the movable body to a home position where a predetermined axial line and an optical axis of the optical element are coincided with each other;
    wherein the magnetic spring comprises:
        a home position returning magnet which is disposed in one of the movable body and the fixed body; and
        an attracted member which is disposed in an other of the movable body and the fixed body, so that a magnetic attraction force acts between the attracted member and the home position returning magnet;
    wherein one of the attracted member and the home position returning magnet is disposed only at one position in a bottom part of the movable body;
    wherein an other of the attracted member and the home position returning magnet is disposed only at one position in the fixed body;
    wherein the attracted member and the home position returning magnet are respectively disposed on the optical axis at the home position and face each other in a direction of the optical axis.

2. The optical unit with a shake correction function according to claim 1, wherein
    the attracted member is a magnetic member.

3. The optical unit with a shake correction function according to claim 2, wherein
    shapes of the magnetic member and the home position returning magnet are similar to each other.

4. The optical unit with a shake correction function according to claim 2, wherein
    shapes of the magnetic member and the home position returning magnet are a quadrangle.

5. The optical unit with a shake correction function according to claim 4, wherein
    the magnetic drive mechanism comprises:
        a first magnetic drive mechanism structured to swing the movable body around a first swing axis perpendicular to the optical axis; and
        a second magnetic drive mechanism structured to swing the movable body around a second swing axis which is perpendicular to the optical axis and intersects the first swing axis,
    wherein a driving current in the first magnetic drive mechanism for swinging the movable body by a predetermined angle around the first swing axis is smaller than a driving current in the second magnetic drive mechanism for swinging the movable body by the predetermined angle around the second swing axis,
    the shapes of the magnetic member and the home position returning magnet are a rectangle, and
    a short side direction of the rectangle is a direction along the first swing axis, and a long side direction of the rectangle is a direction along the second swing axis.

6. The optical unit with a shake correction function according to claim 4, further comprising:
    a flexible printed circuit board which is connected with the movable body,
    wherein the shapes of the magnetic member and the home position returning magnet are a rectangle, and
    wherein a short side direction of the rectangle is an extended direction of the flexible printed circuit board, and a long side direction of the rectangle is a direction perpendicular to the extended direction.

7. The optical unit with a shake correction function according to claim 1, wherein
    the swing support mechanism is a gimbal mechanism.

8. An optical unit with a shake correction function, comprising:
    a movable body comprising an optical element;
    a swing support mechanism which swingably supports the movable body;
    a fixed body which supports the movable body through the swing support mechanism;
    a magnetic drive mechanism structured to swing the movable body; and
    a magnetic spring structured to return the movable body to a home position where a predetermined axial line and an optical axis of the optical element are coincided with each other;
    wherein the magnetic spring comprises:
        a home position returning magnet which is disposed in one of the movable body and the fixed body; and
        an attracted member which is disposed in an other of the movable body and the fixed body, so that a magnetic attraction force acts between the attracted member and the home position returning magnet,
    wherein the attracted member and the home position returning magnet are disposed on the optical axis and face each other in a direction of the optical axis,
    wherein the attracted member is a magnetic member,
    wherein the magnetic drive mechanism comprises:
        a first magnetic drive mechanism structured to swing the movable body around a first swing axis perpendicular to the optical axis; and
        a second magnetic drive mechanism structured to swing the movable body around a second swing axis which is perpendicular to the optical axis and intersects the first swing axis,
    wherein a driving current in the first magnetic drive mechanism for swinging the movable body by a predetermined angle around the first swing axis is smaller than a driving current in the second magnetic drive mechanism for swinging the movable body by the predetermined angle around the second swing axis,
    shapes of the magnetic member and the home position returning magnet are a rectangle, and
    a short side direction of the rectangle is a direction along the first swing axis, and a long side direction of the rectangle is a direction along the second swing axis.

9. The optical unit with a shake correction function according to claim 8, wherein
    the shapes of the magnetic member and the home position returning magnet are similar to each other.

10. An optical unit with a shake correction function, comprising:
    a movable body comprising an optical element;
    a swing support mechanism which swingably supports the movable body;
    a fixed body which supports the movable body through the swing support mechanism;
    a magnetic drive mechanism structured to swing the movable body;

a magnetic spring structured to return the movable body to a home position where a predetermined axial line and an optical axis of the optical element are coincided with each other; and a flexible printed circuit board which is connected with the movable body, wherein the magnetic spring comprises:

a home position returning magnet which is disposed in one of the movable body and the fixed body; and an attracted member which is disposed in an other of the movable body and the fixed body, so that a magnetic attraction force acts between the attracted member and the home position returning magnet, wherein the attracted member and the home position returning magnet are disposed on the optical axis and face each other in a direction of the optical axis, wherein the attracted member is a magnetic member, wherein shapes of the magnetic member and the home position returning magnet are a rectangle, and wherein a short side direction of the rectangle is an extended direction of the flexible printed circuit board, and a long side direction of the rectangle is a direction perpendicular to the extended direction.

11. The optical unit with a shake correction function according to claim 10, wherein the shapes of the magnetic member and the home position returning magnet are similar to each other.

\* \* \* \* \*